(12) United States Patent
Salem et al.

(10) Patent No.: US 11,009,248 B2
(45) Date of Patent: May 18, 2021

(54) ADAPTIVE COMFORT CONTROL SYSTEM

(71) Applicants: Mohamed Farouk Salem, Fresno, CA (US); Michael Robert Sullivan, Scottsdale, AZ (US)

(72) Inventors: Mohamed Farouk Salem, Fresno, CA (US); Michael Robert Sullivan, Scottsdale, AZ (US)

(73) Assignee: Air₂O Inc., Phoenix, AZ (US)

( * ) Notice: Subject to any disclaimer, the term of this patent is extended or adjusted under 35 U.S.C. 154(b) by 0 days.

(21) Appl. No.: 15/949,988

(22) Filed: Apr. 10, 2018

(65) Prior Publication Data

US 2019/0309975 A1  Oct. 10, 2019

(51) Int. Cl.

| | | |
|---|---|---|
| F24F 11/46 | (2018.01) | |
| F24F 11/56 | (2018.01) | |
| F24F 11/64 | (2018.01) | |
| F24F 11/65 | (2018.01) | |
| F24F 11/72 | (2018.01) | |
| G05B 13/04 | (2006.01) | |
| F24F 11/52 | (2018.01) | |
| H04L 12/28 | (2006.01) | |
| F24F 110/10 | (2018.01) | |
| F24F 110/12 | (2018.01) | |
| F24F 110/20 | (2018.01) | |
| F24F 110/22 | (2018.01) | |
| F24F 110/40 | (2018.01) | |

(Continued)

(52) U.S. Cl.
CPC .............. *F24F 11/46* (2018.01); *F24F 11/52* (2018.01); *F24F 11/56* (2018.01); *F24F 11/64* (2018.01); *F24F 11/65* (2018.01); *F24F 11/72* (2018.01); *G05B 13/048* (2013.01); *F24F 2110/10* (2018.01); *F24F 2110/12* (2018.01); *F24F 2110/20* (2018.01); *F24F 2110/22* (2018.01); *F24F 2110/40* (2018.01); *F24F 2120/12* (2018.01); *F24F 2130/10* (2018.01); *H04L 12/2807* (2013.01); *H04L 12/2816* (2013.01)

(58) Field of Classification Search
None
See application file for complete search history.

(56) References Cited

U.S. PATENT DOCUMENTS

| | | |
|---|---|---|
| 1,970,057 A | 8/1934 | Otto |
| 2,075,487 A | 3/1937 | Van Zandt |
| 5,346,129 A | 9/1994 | Shah et al. |

(Continued)

FOREIGN PATENT DOCUMENTS

| | | |
|---|---|---|
| WO | WO 1999/022284 A1 | 5/1999 |
| WO | WO 2016/140842 A1 | 9/2016 |

OTHER PUBLICATIONS

International Search Report and Written Opinion for Application No. PCT/US2018/026945 dated Dec. 12, 2018, 12 pages.

*Primary Examiner* — Ryan A Jarrett
(74) *Attorney, Agent, or Firm* — Squire Patton Boggs (US) LLP

(57) ABSTRACT

There is provided a comfort management system including a networked comfort management control device. The comfort management control device operates an HVAC interface to maintain an environment utilizing a determined comfort zone range for one or more occupants of an area treated by the HVAC system, and utilizes controlled deviations from an initial set point to maintain comfort while maximizing energy efficiency of the HVAC system.

30 Claims, 8 Drawing Sheets

(51) Int. Cl.
*F24F 120/12* (2018.01)
*F24F 130/10* (2018.01)

(56) References Cited

U.S. PATENT DOCUMENTS

| | | | |
|---|---|---|---|
| 5,548,643 A | 8/1996 | Dalgleish | |
| 5,626,288 A | 5/1997 | Huber | |
| 5,732,879 A | 3/1998 | Low | |
| 5,737,934 A | 4/1998 | Shah | |
| 5,904,047 A | 5/1999 | An | |
| 6,070,110 A | 5/2000 | Shah et al. | |
| 6,892,547 B2 | 5/2005 | Strand | |
| 7,178,350 B2 | 2/2007 | Shah | |
| 7,246,487 B2 | 7/2007 | Hara | |
| 7,770,806 B2 | 8/2010 | Herzon et al. | |
| 7,793,510 B2 | 9/2010 | Perry et al. | |
| 7,854,389 B2 | 12/2010 | Ahmed | |
| 8,155,900 B1 | 4/2012 | Adams | |
| 8,392,025 B2 | 3/2013 | Orfield | |
| 8,660,708 B2 | 2/2014 | Narayanamurthy et al. | |
| 8,695,887 B2 | 4/2014 | Helt et al. | |
| 2006/0032253 A1 | 2/2006 | Lee et al. | |
| 2006/0042283 A1 | 3/2006 | Hwang et al. | |
| 2006/0059928 A1 | 3/2006 | Fujiyoshi et al. | |
| 2006/0168972 A1 | 8/2006 | Fry | |
| 2007/0084937 A1* | 4/2007 | Ahmed | F24F 11/0008 236/44 C |
| 2007/0100666 A1 | 5/2007 | Stivoric et al. | |
| 2007/0119958 A1 | 5/2007 | Kates | |
| 2008/0203178 A1 | 8/2008 | Barrett et al. | |
| 2008/0217418 A1 | 9/2008 | Helt et al. | |
| 2008/0314998 A1* | 12/2008 | Herzon | F25B 49/02 236/1 C |
| 2009/0159716 A1 | 6/2009 | Kim | |
| 2010/0063644 A1 | 3/2010 | Kansal et al. | |
| 2010/0070084 A1 | 3/2010 | Steinberg et al. | |
| 2010/0289643 A1* | 11/2010 | Trundle | H04L 12/282 340/545.1 |
| 2011/0049252 A1 | 3/2011 | Lu et al. | |
| 2012/0029725 A1 | 2/2012 | Lafleur et al. | |
| 2012/0212166 A1 | 8/2012 | Merkel et al. | |
| 2012/0291468 A1 | 11/2012 | Kato et al. | |
| 2013/0055744 A1 | 3/2013 | Travers | |
| 2013/0075484 A1 | 3/2013 | Rhee et al. | |
| 2013/0276462 A1 | 10/2013 | Bollmann | |
| 2013/0299157 A1 | 11/2013 | Murayama et al. | |
| 2014/0000836 A1 | 1/2014 | Xu et al. | |
| 2014/0058566 A1 | 2/2014 | Rains et al. | |
| 2014/0084072 A1 | 3/2014 | Conner et al. | |
| 2014/0096946 A1 | 4/2014 | Rognli et al. | |
| 2014/0262196 A1 | 9/2014 | Frank et al. | |
| 2014/0277756 A1 | 9/2014 | Bruce et al. | |
| 2015/0032269 A1 | 1/2015 | Nishimiya et al. | |
| 2016/0098026 A1* | 4/2016 | Salem | G05B 19/042 700/276 |
| 2016/0116178 A1 | 4/2016 | Vega | |
| 2016/0290672 A1 | 10/2016 | Arensmeier | |
| 2018/0095484 A1* | 4/2018 | George | G05D 22/02 |

* cited by examiner

ADAPTIVE COMFORT CONTROL SYSTEM

FIELD AND BACKGROUND OF THE INVENTION

Field of the Invention

The present invention relates generally to heating, ventilation, and air conditioning ("HVAC") systems. More particularly, the present invention relates to an HVAC system that adaptively maintains a defined and adjustable comfort zone.

BACKGROUND OF THE INVENTION

A longstanding problem in the operation of heating, ventilating and air conditioning (HVAC) equipment is efficient operation of equipment controls, including the temperature sensor or thermostat. This presents a challenge in conditions of changing indoor and outdoor temperatures, humidity levels, occupancy of areas maintained by HVAC equipment, and comfort levels of the occupants. While human occupant comfort is a goal the HVAC industry strives to achieve, without out a more comprehensive view of comfort provision as a system, the cost to provide human comfort can grow precipitously when environmental challenges arise. In many climates, heating and cooling represents a minimum of 50% of a building's average energy consumption.

Prior HVAC systems employ rudimentary control devices in an attempt to operate the HVAC components to maintain environmental temperature for persons that may occupy an area of a building, residence, or other structure treated by the HVAC system. However, human comfort is based on many factors, such as the surrounding air temperature Dry Bulb (DB), Relative Humidity (RH), wind speed (WS) and elevation. Current temperature controllers monitor and track one variable: air temperature Dry Bulb (DB), assuming at low temperatures range all other factors may be ignored. Regulating indoor temperature based this single factor does not maximize energy savings as the seasons vary and use of the treated area varies, and may also lead to occupants being uncomfortable at least part of the time. Further, even so-called "smart" thermostats of prior systems fail to predict the impact of various environmental factors on the HVAC-treated area, and often are incapable of sensing changes (both internal and external to a treated space) that directly affect the comfort of the occupants while minimizing energy usage.

Building environments may treated by a number of methods, and as mentioned above, in prior systems, a single temperature set point is commonly utilized in the hopes of providing a "one solution fits all" approach to environmental comfort. However, homes and places of business commonly suffer from inconsistent comfort management in various rooms, and prior approaches attempt to compensate by techniques such as providing separate thermostats in different building areas or approximately controlling flow of environmental air into distant rooms around a building (e.g., through a building occupant manually opening or closing registers attached to the environmental air system). However, this leads to comfort only approximately being maintained, and not being adaptive to presence of room members, variations in environmental conditions such as weather systems moving through an area, and activity based actions such as exercise of occupants, cooking, bathing or other temperature/humidity modifying activities. Therefore, a need exists for a system that will maximize energy savings while also providing effective comfort to occupants of an HVAC-serviced space.

SUMMARY OF THE INVENTION

As used herein, the term Heating, Ventilation, and Air Conditioning ("HVAC") addresses a broad range of techniques and equipment used in the technology of indoor and environmental comfort. Also for purposes of this application, "HVAC" may include a broad range equipment that is intended to be used in the treatment of internal environments, including chiller units, heat pumps, forced air heat systems, radiant heating systems, geothermal heating systems, steam radiators, geothermal cooling systems, solar heating systems, evaporative coolers, airflow dampers, active or passive ventilation systems, and humidity control systems, among others. These HVAC equipment components are in turn operated by a control unit (for example, in prior systems, a thermostat), which monitors one or more environmental parameters and operates HVAC equipment to maintain an internal environment within desired parameters to achieve comfort for occupants of such internal environments.

Embodiments of the present invention address a comfort management system. The system includes a comfort management control device, that further comprises a processor communicatively coupled to a user interface comprising a display and tactile interface, and a memory device configured to store code executable by the microprocessor and configuration data regarding management of a defined treatment region. The processor is also communicatively coupled to an interface to one or more sensors, the sensors configured to receive one or more environmental parameters regarding the defined treatment region, a communication transceiver for communication with a network, and an HVAC control interface configured to receive commands from the processor to operate one or more HVAC components. The executable code comprises instructions that when executed by the processor performs the steps of receiving an initial set point parameter associated with a comfort target and the defined treatment region, determining a comfort zone range related to the defined treatment region based upon the initial set point parameter and the one or more environmental parameters, and operating the HVAC control interface to condition an environment within the defined treatment region to maintain the environment within the comfort zone range.

Environmental parameters may include any desired data that is useful in maintaining comfort in a defined treatment region, and may include, for example, an indoor temperature, an outdoor temperature, an indoor relative humidity reading, an outdoor relative humidity reading, and an elevation of the defined treatment region, an atmospheric pressure, an altitude, a wind direction, a wind speed, an expected solar irradiation load, an expected human occupant load, an expected equipment and lighting load, and the like. Determining the comfort zone range related to the defined treatment region further comprises analyzing a difference between indoor and outdoor relative humidity, a difference between indoor temperature and outdoor temperature, the initial set point parameter, and an elevation of the defined treatment region.

An initial set point parameter can be any data item related to comfort of a defined treatment region that relates to a particular comfort target. For example, the initial set point parameter may be a desired internal temperature of a defined comfort region that is preferred by a particular comfort target; more particularly, in one case an initial set point parameter may be obtained from a first identified user (e.g. a comfort target) selecting an initial temperature set point of 74° F. Initial set point parameters are not limited only to a single user with a single temperature; for example, the initial set point parameter may comprise one or more of: a preferred indoor temperature, a preferred indoor relative humidity level, a default preferred indoor temperature, a minimum desired indoor temperature, and a maximum desired indoor temperature. In this way, the comfort target to which a particular initial set point parameter is associated can specify a range of values that are preferable to that comfort target. Further, the comfort target can comprise one or more of a person, a group of people, a pet, and an environmentally-sensitive article. Each type of comfort target may have unique desires and attributes that define comfort within the defined comfort region. For example, each person within the aforementioned group of people may have unique preferred temperature ranges, some of which may overlap. Further, embodiments of the present invention allow for the management of an internal space to prevent environmentally-sensitive articles from exceeding desired environmental conditions; for example, certain medications should be stored at no more than 85° F. and no less than 60° F., and certain candles and waxes should not be exposed to temperatures in excess of 88° F. Further, certain pets may be sensitive to environmental conditions, and desired initial set point parameters may be entered for such pets. Each comfort target is uniquely identified in the embodiments of the present invention and associated with a particular initial set point parameter; if no initial set point parameter is entered, a predetermined default initial set point parameter may be utilized by embodiments of the present invention. Further, in association with each comfort target, an occupancy type and preference region of the defined treatment region can be specified; for example, if the comfort target is a pet aquarium that resides within a particular room of a defined treatment region, its initial set point parameter may be further defined to associate only with that room. If a particular person of the treatment target group preferably occupies a master bedroom of the defined treatment region, for example, such information may be provided and associated with the initial set point parameter uniquely associated with that person.

The sensor interface of the present invention may be configured to receive sensor inputs from any desired sensor or data source. For example, the interface to one or more sensors may be configured to accept environmental parameters from one or more of an area occupancy sensor, an infrared temperature measurement sensor, a motion sensor, an internal humidity measurement sensor, an external humidity measurement sensor, a barometric pressure sensor, a GPS geolocation sensor, an internal temperature sensor, an external temperature sensor, an external wind speed sensor, and a weather forecast service. Additionally, the interface to an environmental monitoring sensor may further comprise an interface to an external server to obtain environmental parameters or sensor inputs therefrom.

Embodiments of the present invention allow for operation of a broad variety of HVAC equipment options. For example, embodiments of the comfort management control device's HVAC control interface may be configured to operate one or more of a heat pump, a forced air heat system, a radiant heating system, a geothermal heating system, a geothermal cooling system, a solar heating system, an evaporative cooler, a damper, a ventilation system, and a humidity control system.

Atmosphere may be maintained differentially across an interior volume of a defined treatment region. For example, a room located within the defined treatment region be allowed to deviate from a particular set point by a larger amount in interest of maximizing energy savings if the room is unlikely to be occupied by a comfort target within a particular timeframe. One embodiment of the present invention provides for differential treatment, for example by including at least one damper operating a duct located proximate to the defined treatment region, and wherein the system is further configured to operate the damper based on occupancy by a member of the comfort target of a portion of the defined treatment region proximate the damper. Further, in various embodiments, the system comprises at least one damper, and wherein the system is further configured to operate the damper based on a predicted occupancy by a member of the comfort target of a portion of the treatment region proximate the damper.

While a defined treatment region may be defined to cover an entire interior volume of a particular building, the defined treatment region may be variably defined to apply to a portion of an identified building, such as only a part of a room, multiple rooms of the building, adjoining rooms of the building, a particular floor of the building, and the like. In fact, multiple treatment regions may defined for a particular interior space, each respectively maintaining the environment within the respective treatment regions with respective comfort zone ranges, each of which ranges may vary depending on respective treatment target compositions. As such, embodiments may be further configured to monitor a defined treatment region and adjust one or more defined boundaries of the defined treatment region based on monitoring at least one of the comfort target and a sensor input obtained from the environmental monitoring sensor. As one simple example, as an occupancy and/or infrared sensor detects that another member of the comfort target group enters into an area of the facility being maintained, boundaries of the defined treatment region boundaries may be adjusted so that all of the comfort zone targets are covered by a defined treatment region and the comfort zone may be adjusted to provide aggregate comfort to all of the comfort zone targets.

Configuration data may be entered into the memory of the comfort management control device in any desired manner. In various embodiments, entering configuration data into the memory of the comfort management control device comprises entry of the configuration data through the user interface of the comfort management control device, remote entry of the configuration data from a server communicatively coupled to the communication transceiver, relaying configuration data from a second comfort management control device communicatively coupled to the communication transceiver, entering the configuration data though a user interface of a mobile device communicatively coupled to the communication transceiver, and combinations thereof. Configuration data may include any information necessary to provide for initial and ongoing operation of the comfort management system, and can include, for example, facility information (e.g., information about the building or other interior area where internal environmental conditions are maintained by the comfort management system, including the defined treatment region) and comfort target information. Facility information may include, for example, a square footage (or other areal/volumetric measurements) of the facility, a location of the facility comprising one of an address or latitude-longitude information of the facility, HVAC equipment types operated at the facility, identification of individually controllable areas within the facility, a desired number of individual defined treatment regions within the facility, an average expected occupancy of the treatment facility, external environmental conditions proximate the facility. Comfort target information may include any desired information and may be formatted in any appropriate manner, such as one or more comfort target records, each comfort target record including a comfort target unique ID and one or more of: an initial set point parameter associated with the comfort target unique ID, a comfort target type; a preferred occupancy area of the facility, a default occupancy schedule, and priority information regarding resolution of comfort zone range conflicts. In various embodiments, retrieving an initial set point parameter associated with a comfort target and the defined treatment region further comprises retrieving the initial set point parameter from the configuration data entered into the memory device (for example, from reading the fields of the record associated with the comfort target unique ID).

Monitoring the comfort defined treatment region may be accomplished in any desired manner. For example, in one embodiment, monitoring the defined treatment region further comprises: predicting a change in the composition of the comfort target, computing an occupancy interval affected by the change in the comfort target, computing a desired comfort range for the occupancy interval, and operating the HVAC interface to bring the environment of the defined treatment region to within the desired comfort range for the computed occupancy interval.

Aspects of the present invention also provide for predictive modeling to allow the comfort management system to provide optimal comfort and maximize energy savings based on changes to the comfort target. For example, aspects of the invention further comprise predicting when a member of the comfort target is predicted to arrive at a location within an area proximate to the defined treatment region, and may be accomplished, for example, by accessing the comfort target's stored schedule, by receiving an input from a mobile device in possession of the comfort target, by tracking an input from a vehicle navigation system used by the comfort target, by receiving an SMS text message sent from the comfort target's mobile device, by computing an estimated time of arrival of the comfort target based on a current location of the comfort target and the comfort target's mode of travel, and from receiving and input from an app installed on the mobile device in possession of the comfort target. Additionally in various embodiments, prediction of facility ingress or egress by a member of the comfort target may also be accomplished by receiving, through the communications interface, a communication from a mobile device associated with a member of the comfort target, and wherein the communication comprises one or more of: a reported location of a mobile device, a calculated direction of movement of the mobile device, an estimated time of arrival reported by an app being executed by the mobile device, an estimated time of departure based on historical data associated with movement of the mobile device, and an estimated time of departure based upon a scheduled event associated with the member of the comfort target. Yet another embodiment of the present invention provides adjustment of the defined treatment region by predicting when the comfort target is to be within the defined treatment region, and operating HVAC to bring the defined treatment region to within a computed comfort level for the predicted occupancy state of the defined treatment region by the comfort target.

In one embodiment, the comfort target may comprise a person. In additional aspects of the present invention the comfort target comprises a plurality of persons respectively associated with a plurality of initial set point parameters, and wherein determining a comfort zone range further comprises computing a composite comfort level based on the plurality initial set point parameters. The computing function may involve resolution of conflicts when comfort zone ranges may not completely overlap for each member of the comfort target, and use of priority parameters respectively associated with the initial set point parameters for each of the members of the comfort target. In yet another embodiment, the comfort target comprises a plurality of persons respectively associated with a plurality of respective initial set point parameters, and wherein determining a comfort zone range further comprises computing a consensus comfort range when members of the comfort target are collocated within an internal area of the defined treatment region.

Comfort zone range computation in various embodiments may be accomplished using any desired manner. For example, determining a comfort zone range related to the defined treatment region may further comprise identifying a change in one or more environmental loading factors and adjusting operation of the HVAC interface to compensate for the change in the one or more environmental loading factors. The sensor interface of the present invention, along with ongoing monitoring of environmental conditions, allows for inclusion of changes in various environmental factors to be considered in determining comfort zone ranges. By way of a simple example, if more or fewer people enter a treated facility, or if appliances such as dishwashers, ovens, or showers are operated within the facility, environmental loading conditions may be altered requiring compensational operation of HVAC equipment. Accordingly, aspects of the present invention provide that a change in the environmental loading factors includes at least one of: a change in the number of members of the comfort target, a weather forecast obtained through the communications transceiver, a change in an operational status of an appliance located within the defined treatment region, a change in operational status of bathing facilities located within the defined treatment region, a detected egress by a member of the comfort target, a detected ingress by a member of the comfort target, a predicted ingress or egress by a member of the comfort target, a change in wind patterns proximate to the defined treatment region, detection through the one or more sensors of a precipitation event exterior to and proximate to the defined treatment region, and a change in the operational status of landscape watering systems proximate to the defined treatment region.

Aspects of the present system may monitor environmental and occupancy conditions over time, and adjust operation of the HVAC system in a manner to optimize comfort and energy performance thereof. For example, embodiments provide for monitoring a behavior of a member of the comfort target to detect a perceived level of comfort, and adjusting the comfort zone range based on the detection. Sensors of the present invention may allow for the determination, for instance, that the member of the comfort group is engaged in exercise, or has just completed exercise, resulting in a likely need for decreased air temperature. Infrared room sensors may detect that the member of the comfort group is experiencing an elevated (or decreased) body temperature, and is likely to require adjustment of a comfort zone temperature. Further, motion sensors may detect excessive movement or atmospheric agitation of the member of the comfort target, indicating, for instance, that the member is fanning themselves in an attempt to cool down. Additionally, embodiments may receive a direct input from the member of the comfort group via an audio utterance (such as stating, to a microphone included in the sensor suite, that a warmer or cooler condition is required), gesture-based methods (such as, for instance, making a predetermined gesture to a video camera located within a sensor suite), direct entry methods (such as, for instance, entering through the user interface of the comfort management control device that a temperature change was needed), response to a query, where an embodiment of the system of the present invention transmits a signal to a speaker proximate the member of the comfort target, asking whether the comfort target is comfortable, too warm, or too cold, and soliciting the member to speak a response that will be received by a microphone associated with the sensor suite, by receipt of an input from the member of the comfort target's mobile device, indicating that a change in temperature is required. Further, in one embodiment, detecting a perceived level of comfort includes one or more of detecting a movement pattern of the member of the comfort region, detecting a change in body temperature of the member of the comfort region, and monitoring changes to an initial set point parameter entered by the member of the comfort target. Yet another aspect provides that detecting a perceived level of comfort includes one or more of accumulating historical data regarding use of the treatment region by the member of the comfort target, and identifying a variable comfort zone range based on the historical data.

A comfort management system of the present invention may comprise a plurality of comfort management control devices. Such a configuration may be desirable, for instance, where a treated facility includes several floors or otherwise partially or wholly discontinuous/disconnected areas that are serviced by separate HVAC components, and where individual control of the separate components is desired to achieve comfort for individual comfort target members located proximate the separate areas. Thus, an embodiment of the present invention may further comprise a plurality of communicatively coupled comfort management control devices located within the defined treatment region, wherein the plurality of communicatively coupled comfort management control devices comprise respectively connected HVAC control interfaces to maintain an environmental condition of the defined treatment region within the comfort zone range. In one optional embodiment, a facility being serviced by systems of the present invention may include a plurality of defined treatment regions, each respectively associated with its own comfort management control device. Further, the plurality of communicatively coupled comfort management control devices may be connected in a master/slave protocol, wherein a first of the plurality of the comfort management control devices is designated as a master control device and the remainder of the plurality designated as slave control devices, and the master control device provides one of data or instructions to the slave control devices to maintain the environmental condition of the defined treatment region within the comfort zone range.

In additional aspects, in embodiments of the present invention, the user interface further comprises a networked input for receiving commands from one of a mobile device communicatively coupled to the comfort management control device through the communication transceiver. Thus, the mobile device may be operated by a member of the comfort target to affect operation of the comfort management system in various ways. For example, the mobile device may be further configured to execute an application that communicatively provides data to the comfort management control device and receives information from the comfort management control device.

Various methods may also be provided to allow the comfort management control device to communicate without external components and networks. For example, in various embodiments, the communication transceiver provides one or more of a wireless or wired connectivity from the comfort management control device to a network. The communication transceiver may be configured to operate with a wireless protocol comprising one or more of: an ISO 14443 protocol; an ISO 18000-6 protocol; a Bluetooth protocol; a Zigbee protocol; a Wibree protocol; a WiFi protocol, an IEEE 802.15 protocol; an IEEE 802.11 protocol; an IEEE 802.16 protocol; an ultra-wideband (UWB) protocol; a cellular telephony protocol; and combinations thereof. Further, the communication transceiver may be configured to operate in a custom RF protocol to communicate with external components, networks, or sensors.

Another embodiment of the present invention may include a temperature control system for controlling the environmental conditions in a space, the system including a temperature control unit having a memory and a processor with a program operating in the memory executing the steps of gathering indoor environmental information by the temperature control unit, gathering outdoor environmental information via a network communicatively coupled to the temperature control unit, determining a comfort zone range based on the indoor and outdoor conditions, determining an operational mode of the system, and controlling temperature control equipment to maintain the floating set point.

In another embodiment, the temperature control unit obtains indoor temperature information from a temperature sensor in the space. The temperature control unit may determine the operational mode of the system based on information gathered from an occupancy sensor. In another aspect, the location of the temperature control unit is determined using a GPS unit; and further, the location may include the altitude of the temperature control unit. Information on the altitude of the temperature control unit may also be gathered from an altimeter in the temperature control unit, and the outdoor environmental information may be obtained based on the location of the temperature control unit. In one implementation the outdoor environmental information is derived from the location and altitude of the temperature control unit, and the altitude of the temperature control unit may also be determined from the location of the temperature control unit. Further, indoor environmental information may include humidity information that is obtained from a humidity sensor coupled to the temperature control unit.

Yet another embodiment of the present disclosure includes a temperature control unit including a processor, a memory, an input/output unit, at least one indoor environmental monitoring unit coupled to the input/output unit, a network connection unit connected to a network and an outdoor environmental unit coupled to the network connection unit to gather information on outdoor environmental conditions via the network where a comfort zone range is determined based on information from the indoor environmental unit and the outdoor environmental unit. The indoor environmental unit may include a temperature sensor and a humidity sensor. In one implementation, the temperature control unit may include an altitude detection unit, and the altitude detection unit may further comprise an altimeter. In another embodiment, at least one mechanical device such as an HVAC component is controlled based on the comfort zone range. Another embodiment includes obtaining outdoor environmental information from the location and altitude of the temperature control unit. In another embodiment, the temperature control unit may include a location detection unit coupled to the input/output unit, and in one further aspect, the location detection unit may comprise a GPS unit. Further, outdoor environmental information may also be determined, in various aspects, based on the location of the temperature control unit.

BRIEF DESCRIPTION OF THE DRAWINGS

Details of the present invention, including non-limiting benefits and advantages, will become more readily apparent to those of ordinary skill in the relevant art after reviewing the following detailed description and accompanying drawings, wherein.

DETAILED DESCRIPTION OF THE INVENTION

Figure 1:
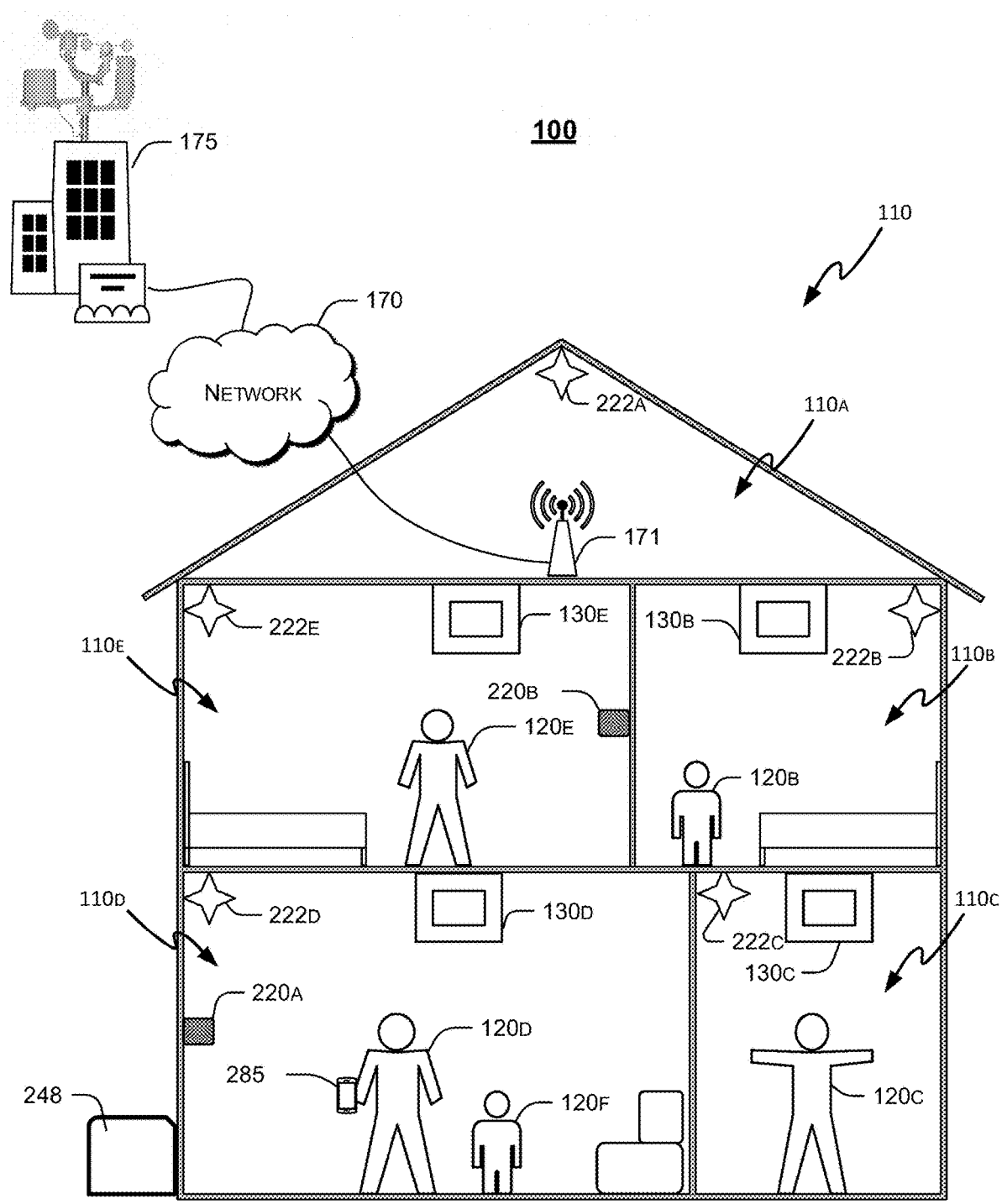
FIG. 1 depicts a target treatment area (a home) with aspects of the present invention in a block diagram configuration.

While various embodiments of the present invention are described herein, it will be apparent to those of skill in the art that many more embodiments and implementations are possible that are within the scope of this invention. Accordingly, the present invention is not to be restricted except in light of the attached claims and their equivalents.

In the present disclosure, the words "a" or "an" are to be taken to include both the singular and the plural. Conversely, any reference to plural items shall, where appropriate, include the singular.

The present technology may be described in terms of functional block components and various processing steps. Such functional blocks may be realized by any number of hardware or software components configured to perform the specified functions and achieve the various results. For example, the present technology may employ systems, technologies, devices, algorithms, designs, services, and the like, which may carry out a variety of functions. In addition, the present technology may be practiced in conjunction with any number of hardware and software applications and environments. For example, the present technology may be practiced in conjunction with any number of software applications, interior or exterior environmental monitoring devices, weather networks, internet-accessible networks, weather radio broadcasts, and computing devices such as servers, computer databases, personal computers, and portable computing devices, automobile computing devices, aircraft computing devices. The system described is merely one exemplary application for the invention.

Systems and methods describing various aspects of the present adaptive comfort control system may operate in conjunction with any suitable computing process or device, interactive system, input system or method, output system or method, and/or telecommunication network. Various representative implementations of the present technology may be applied to any computing device or application configured to communicate via a telecommunication network or wired communication protocol. Certain representative implementations may comprise, for example, program code stored on any combination of computing devices, wherein the program code facilitates maintaining a defined comfort region in a manner to provide comfort to a comfort target. Various representative algorithms may be implemented with any combination of data structures, objects, processes, routines, other programming elements, and computing components and/or devices.

The present technology may involve multiple programs, functions, computing devices (such as a comfort management control device, a mobile communication device, a home network, or network-accessible client computers and/or servers), and the like. While the exemplary embodiments are described in conjunction with conventional computing devices, the various elements and processes may be implemented in hardware, software, or any combination of hardware, software, and other systems. Further, the present technology may employ any number of conventional techniques for generating and/or presenting content, interfacing a computing device to a network, transmitting and/or receiving data, providing a user interface, communicating information, interfacing with a user, detecting and/or analyzing input to a computing device, gathering data, tracking environmental parameters, collecting and managing user accounts and information, calculating statistics and environmental loading effects, and the like.

A computing device may comprise conventional components, such as a processor, a local memory such as RAM, non-volatile memory such as FLASH memory, long term memory such as a hard disk, a network adaptor, and any number of input and/or output devices such as a keyboard, mouse, monitor, touch screen, microphone, speaker, motion sensor, orientation sensor, infrared sensor, temperature sensor, humidity sensor, electrical current sensor, light sensor, and the like. The various memories of the computing device may facilitate the storage of one or more computer instructions, such as a software routine and/or software program, which may be executable by the processor to perform the methods of the invention. A computing device may comprise an embedded processor in such as a comfort management control device, a personal computer, a server, a mobile phone, a smart phone, a tablet computer, a kiosk, a portable computer, a vehicle-embedded computer, and the like. Further, the databases, systems, and/or components of the present technology may include any combination of databases, systems, and/or components at a single location or at multiple locations. Each database, system, and/or component of the present technology may comprise any suitable security features, such as firewalls, access codes, encryption, de-encryption, compression, decompression, and the like.

The present technology may be embodied as a method, a system, a device, and/or a computer program product, for example within a comfort management control device. Accordingly, the present technology may take the form of an entirely software embodiment, an entirely hardware embodiment, or an embodiment combining aspects of both software and hardware. Furthermore, the present technology may take the form of a computer program product on a computer-readable storage medium having computer-readable program code embodied in the storage medium. Any suitable computer-readable storage medium may be utilized, including any combination of hard disks, CD-ROM, FLASH memory, optical storage devices, magnetic storage devices, USB memory devices, any appropriate volatile or non-volatile memory system, and the like. The present technology may take the form of a downloadable and/or cloud-based non-downloadable computer program product and/or methods.

Software and/or software elements according to various aspects of the present technology may be implemented with any programming, scripting, or computer language or standard, such as, for example, AJAX, C, C++, Java, JavaScript, COBOL, assembly, PERL, Python, Ruby, eXtensible Markup Language (XML), PHP, CSS, etc., or any other programming and/or scripting language, whether now known or later developed. Further, the present technology may be used in conjunction with a computing device running any operating system such as any version of Windows, MacOS, OS/2, BeOS, Linux, UNIX, Android, iOS, or any other operating system, whether now known or later developed.

In addition, the present technology may employ any number of conventional techniques for data transmission, signaling, data processing, network control, and the like. Computing devices according to various aspects of the present technology may communicate with each other by one or more telecommunication networks. The telecommunication network may comprise a collection of terminal nodes, links, and any intermediate nodes which are connected to enable communication (including transfer of data) at a distance between the terminal nodes. In some embodiments, a terminal node may comprise a computing device. The telecommunication network may comprise any suitable communication system, such as the Internet, an intranet, an extranet, WAN, LAN, satellite communications, cellular radio network, wireless network, telephone network, cable network, and the like. Moreover, computing devices according to various aspects of the present technology may communicate over the telecommunication network using TCP/IP, HTTP, HTTPS, FTP, IPX, AppleTalk, IP-6, NetBIOS, OSI, and/or any number of existing or future protocols. The telecommunication network may be simply referred to as a network.

As used herein, the term "mobile device," "mobile electronic device," or "device" generally refers to any electronic device capable of being moved from place to place, and may be a stand-alone device such as a laptop computer, a desktop computer, a mobile subscriber communication device, a mobile phone, a personal digital assistant (PDA), a data tablet, a digital camera, a video camera, a video game console, a media player, a global positioning system (GPS), Universal Serial Bus (USB) keys, mobile weapons, smart watches or jewelry, embedded electronics, automobile communication interfaces, and combinations thereof. A mobile electronic device may also be any electronic device integrated with another system or device. For example, a stereo, global positioning system, or other electronic device contained within a vehicle may be utilized in concert with the present invention. Software to implement methods of the present invention can be (1) installed on, or (2) downloaded onto a mobile device indirectly or directly at any time by an authorized user through the Internet, SMS text message, through wireless communication with an app provisioning store, or in any other suitable manner and at any suitable time for carrying out a method according to the invention.

In a preferred embodiment, a comfort zone range is derived from a comfort target's initial set point parameter along with current environmental conditions in the defined treatment region. The comfort zone range comprises a value such as a temperature, at which a comfort target will experience comfort within the defined treatment region. The comfort zone range may comprise a range of values, such as a range of temperatures, or may be defined as a single value, such as a single temperature, plus an additional amount of hysteresis to prevent the HVAC system from cycling on and off at an undesirable high frequency. The comfort zone range is determined from computations intended to determine a comfortable atmosphere for a comfort target, and may vary substantially from the comfort target's initial set point parameter. Depending on the particular environmental conditions at the time, maintaining an environmental condition for the comfort target using the dynamically computed comfort zone range may lead to substantial energy savings over use of a single initial set point provided by the comfort target, all while providing HVAC treatment of an environment within the defined treatment region that is acceptable for the comfort target's physical comfort.

Figure 3A:
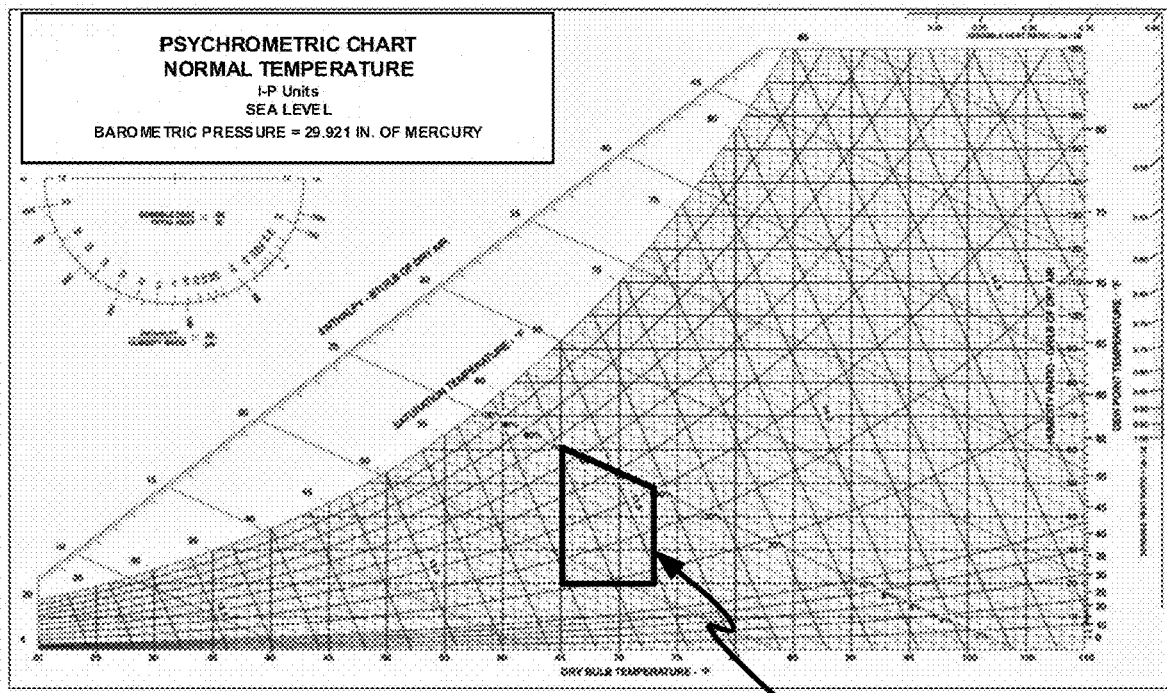
FIG. 3A illustrates a psychrometric chart of a type commonly utilized by those of skill in the HVAC-related arts, with a comfort zone identified.
Figure 3B:
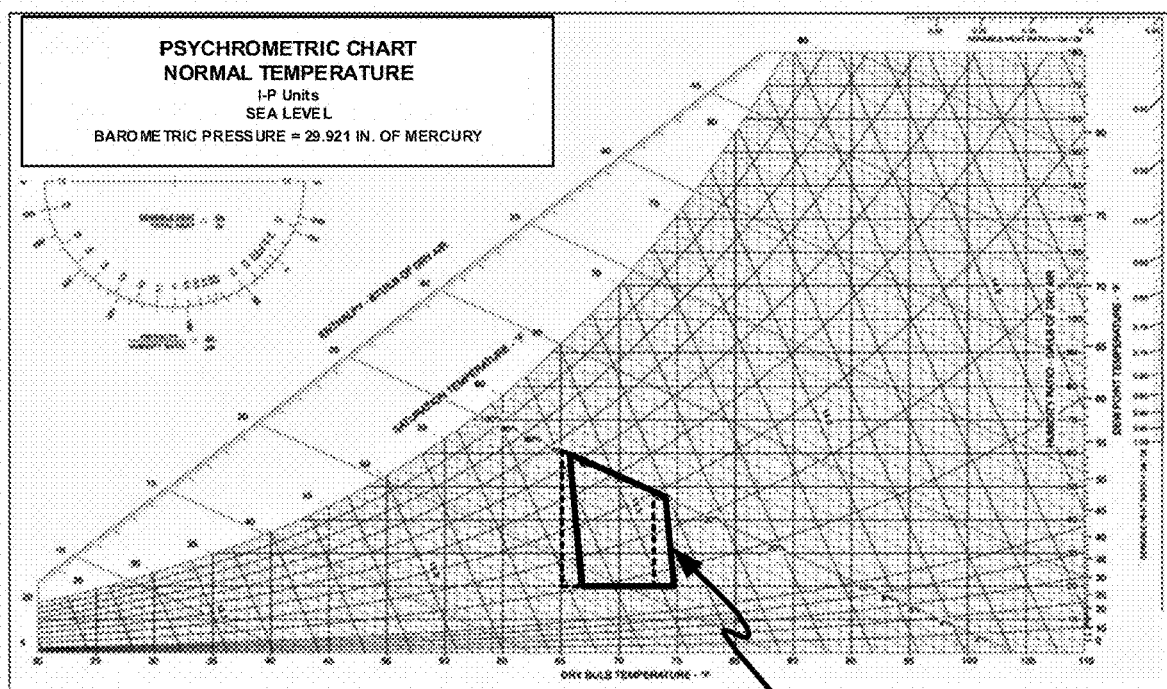
FIG. 3B illustrates a psychrometric chart of a type commonly utilized by those of skill in the HVAC-related arts, with a modified comfort zone range based upon aspects of the present invention.

FIGS. 3A and 3B illustrate psychrometric charts of a type commonly utilized by those of skill in the HVAC-related arts. Psychrometric charts graphically illustrate physical and thermodynamic properties of gas-vapor mixtures using environmental parameters relating to water moisture in air (such parameters typically include factors such as: dry bulb temperature, wet bulb temperature, dew point temperature, relative humidity, moisture content, enthalpy, and specific volume). As such, psychrometric charts are useful tools in determining environmental treatment options to provide comfort to persons (or, in addition, animals or other items that are environmentally sensitive) within a defined space. As such, FIGS. 3A and 3B are instructive regarding the use of the comfort zone range of the present invention.

FIG. 3A, shows a typical comfort zone 300 for a person occupying an internal space of a facility, and the locus of points regarding environmental parameters within the comfort zone space 300 would typically result in a person occupying the treated space reporting that they are "comfortable." Yet, in formulating aspects of the present invention, it has been determined that as effective relative humidity increases (effective relative humidity being a function of the indoor relative humidity and the outdoor relative humidity, and the delta T between indoor and the outdoor temperature), the indoor perceived comfort temperature of a person in the treated environmental space also increases. These changes are shown in the revised comfort zone 310 in FIG. 3B, showing a skewed shift to the right from the original (dotted) comfort zone 300. This provides two opportunities: saving energy in summertime by not engaging a cooling HVAC system needlessly (see, e.g., the lower right part of modified comfort zone range 310), and prevention of uncomfortable temperatures in winter months (seen at the lower left portion of comfort zone range 310). Thus, embodiments of the present invention accordingly provide optimized comfort while minimizing energy expenditures by dynamically calculating a comfort zone range based on environmental parameters and an initial set point parameter provided by a person (the comfort target) that is occupying an internal space of a facility that is being environmentally maintained by an HVAC control system of the present invention.

FIG. 1 depicts a general overview diagram 100 of a Comfort Management System ("CMS") of the present invention in context of a facility. For purposes of the present invention, a "facility" may include a home, an office building, a work building, a business, a recreational structure, or any other structure including an interior space that is to be environmentally managed. Those of skill in the art also appreciate that the scope of the invention may also include movable enclosed objects including vehicles that also are amenable to treatment of an interior environmental space, and accordingly, "facility" may include such vehicles. Regarding FIG. 1, facility 110 includes an attic area 110A, a first upper room 110B, a second upper story room 110E, a first lower story room 110C, and a second lower story room 110D. Comfort management control devices ("CMCDs") 220A, 220B, are respectively located in rooms 110D, 110E. The CMCDs are communicatively coupled to network 170 through respective communication transceivers (not shown), and in the illustrated embodiment the coupling occurs through a wireless router 171. The CMCDs are also linked through the network 170 external facility 175, which may comprise an external server, and/or an information service. The information service may comprise a commercial or governmental weather information service that may provide information such as temperature and relative humidity, wind speed, wind direction, barometric pressure, precipitation, weather forecasts, and other weather related information regarding a particular location. By furnishing the location of the facility 110 to the information service, local information pertinent to facility 110 may be received through the network 170 and forwarded to the CMCDs 220A, 220B for analysis. Location of the facility 110 may be obtained through a GPS unit incorporated within one or more of the CMCDs 220A, 220B, or may be entered by a user when the CMS is installed. Alternatively, location of facility 110 may be obtained for an IP address associated with router 171, or other Internet address associated with facility 110.

CMCDs 220A, 220B, are communicatively coupled to HVAC system component 248. HVAC system component 248 may comprise a conventional heat pump unit and/or a including chiller unit, a forced air heat system, a radiant heating system, a geothermal heating system, a steam radiator, a geothermal cooling system, a solar heating system, evaporative coolers, an airflow damper, an active or passive ventilation systems, and a humidity control system, among possible HVAC components. Rooms 110B, 110C, 110D, 110E are respectively serviced by registers 130B, 130C, 130D, 130E, which are in turn connected to ducts operated by HVAC system component 248. Not shown, but also optionally located within registers 130B, 130C, 130D, 130E, may be respective damper units operated by CMCDs 220A 220B. Any of persons 120B, 120C, 120D, 120E, 120F, may individually comprise a comfort target as described in accordance with embodiments set forth above, or may collectively comprise members of a comfort target group. With any one of the persons 120B, 120C, 120D, 120E, 120F, or any of the plurality of persons 120B, 120C, 120D, 120E, 120F, individual set point parameters may be entered and stored in memory of CMCDs 220A, 220B. As described above in more detail, individual set points establish preferred indoor temperatures or other preferred indoor conditions for each respective person of the comfort target. For example person 120E may prefer an initial set point parameter temperature of 73° F., while person 120F may prefer for an initial set point parameter temperature of 76° F. The CMS may be configured to track a single comfort zone range associated with any one of persons 120B, 120C, 120D, 120E, 120F, or may determine a hybrid or aggregate comfort zone range associated with a plurality of persons 120B, 120C, 120D, 120E, 120F. Sensors may be placed in any location desired within or outside of facility 110 to obtain environmental parameters allowing computation of an optimal comfort zone range for the identified occupants of facility 110. Sensors such as those shown in 222A, 222B, 222C, 222D, and 222E may comprise any type of sensors configured to obtain environmental parameters in computation and adjustment of a comfort zone range, such as a temperature sensor; an area occupancy sensor; an infrared temperature measurement sensor; an internal humidity measurement sensor, an external humidity measurement sensor, a barometric pressure sensor, a GPS geolocation sensor, an internal temperature sensor, an external temperature sensor, an external wind speed sensor, an external wind direction sensor, a precipitation sensor, and a weather forecast service interface. In one embodiment of the present invention sensors 222A, 222B, 222C, 222D, and 222E are configured to provide environmental parameters to CMCDs 220A, 220B, providing information such as whether or not each respective room of facility 110 is occupied, a body temperature of an occupant of any of the rooms 110A, 110B, 110C, 110D, 110E of the facility 110, temperature of any of the rooms 110A, 110B, 110C, 110D, 110E, a relative humidity of any of the rooms 110A, 110B, 110C, 110D, 110E, and operational status of an appliance within any of the rooms 110A, 110B, 110C, 110D, 110E, or any other desired environmental parameter that may assist with computation of the comfort zone range as identified above. The CMCDs 220A 220B may also detect changes in environmental loading parameters utilized in such computations. For example, but not by way of limitation, sensor 222E reports an environmental parameter that person 120E is present within room 110E, and sensor 222C reports an environmental parameter that person 120C is present within room 110C and is exercising. Each of these factors respectively affects a comfort zone range that made best be individually computed for each of the defined treatment regions to maintain comfort for the prospective occupants.

Figure 1A:
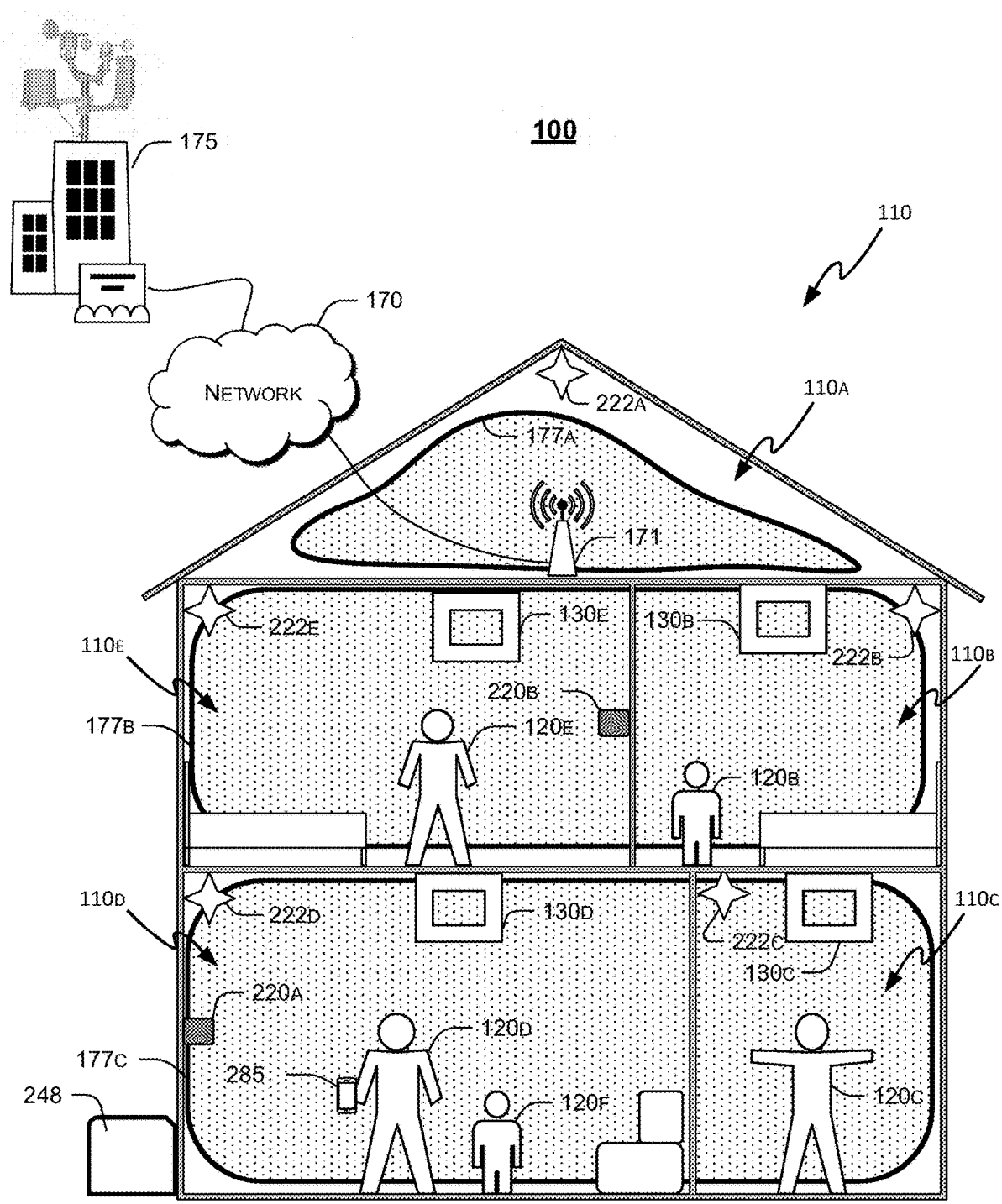
FIG. 1A depicts the target treatment area of FIG. 1 with exemplary defined treatment regions.

Within facility 110, one or more defined treatment regions are assigned to the internal areas of the facility 110. In one embodiment, a single defined treatment region covers the habitable spaces of facility 110, and in an additional aspect, a single person is assigned as the comfort target. As an alternative embodiment, as illustrated FIG. 1A, the facility 110 may be apportioned into a plurality of defined treatment regions, whether habitable or not, to provide more refined control of environmental conditions within areas of facility 110. As shown in FIG. 1A, a defined treatment region 177A may be assigned to attic area 110A so that attic ventilation may be controlled, a defined treatment region 177B may be assigned to upper floor rooms 110B, 110E, preferably controlled through CMCD 220B, and a third defined treatment region 177C may be assigned to bottom floor rooms 110 C, 110 D, preferably controlled by CMCD 220A. Defined treatment regions 177A, 177B, and 177C, may also be controlled through a single CMCD, wherein sensors located within the respective treatment regions provide environmental parameters to the CMCD whereupon comfort zones are individually determined for each respective defined treatment region, and HVAC system components 248 are operated to maintain the respective defined treatment regions within their respectively associated comfort zones.

Figure 1B:
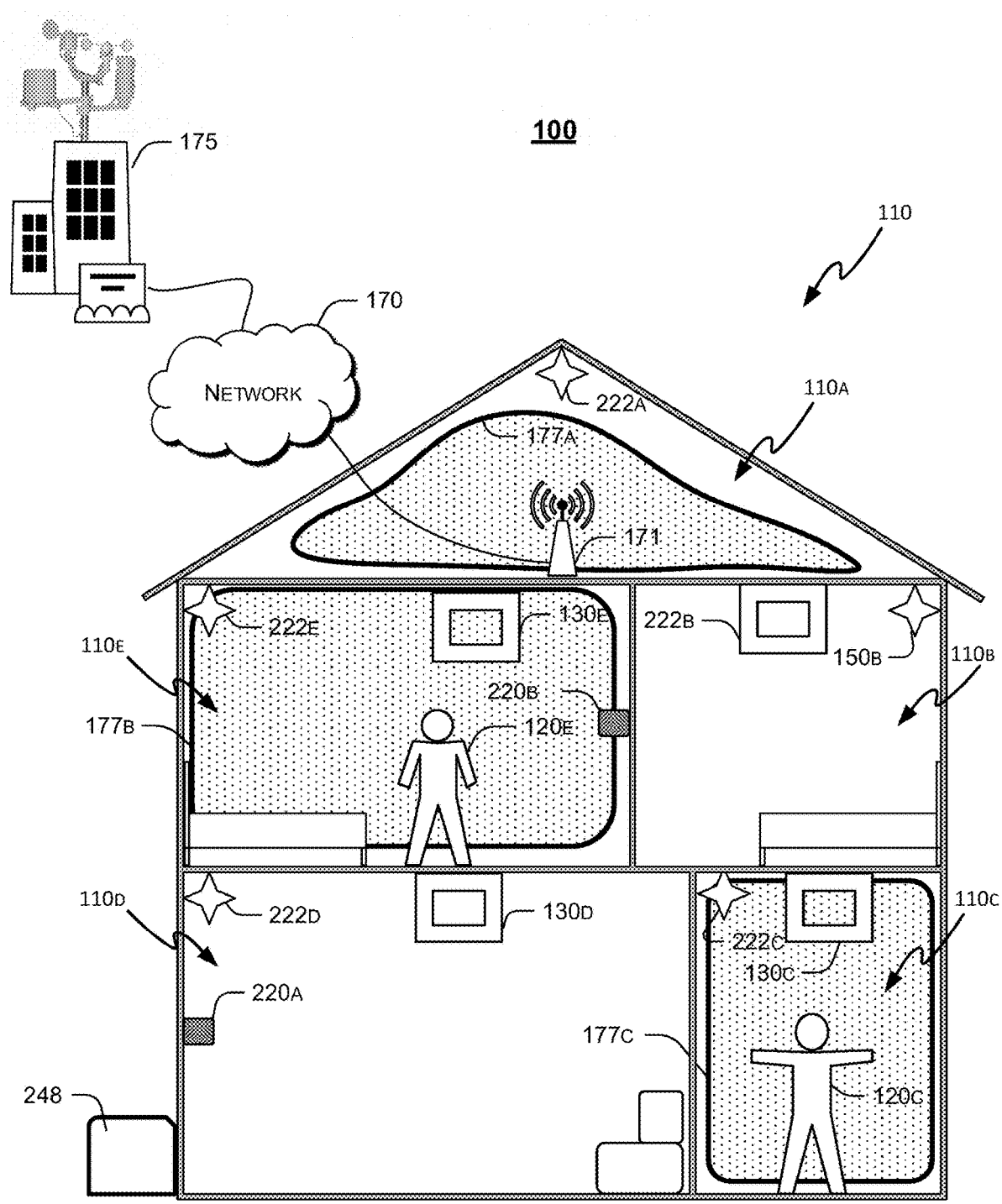
FIG. 1B depicts the target treatment area of FIG. 1 with exemplary defined treatment regions in a different configuration.

Defined treatment regions may be dynamically adjusted in extent in accordance with inputs obtained from sensors coupled to a CMCD. As an example, FIG. 1B shows the defined treatment region 177B has been adjusted in its extent to cover room 110E as environmental sensor 222B reports that room 110B is unoccupied (and that sensor 222E reports that room 110E is occupied). Further, FIG. 1B shows the defined treatment region 177C has been adjusted in its extent to cover room 110C as environmental sensor 222D reports that room 110D is unoccupied (and that sensor 222C reports that room 110C is occupied).

Figure 2:
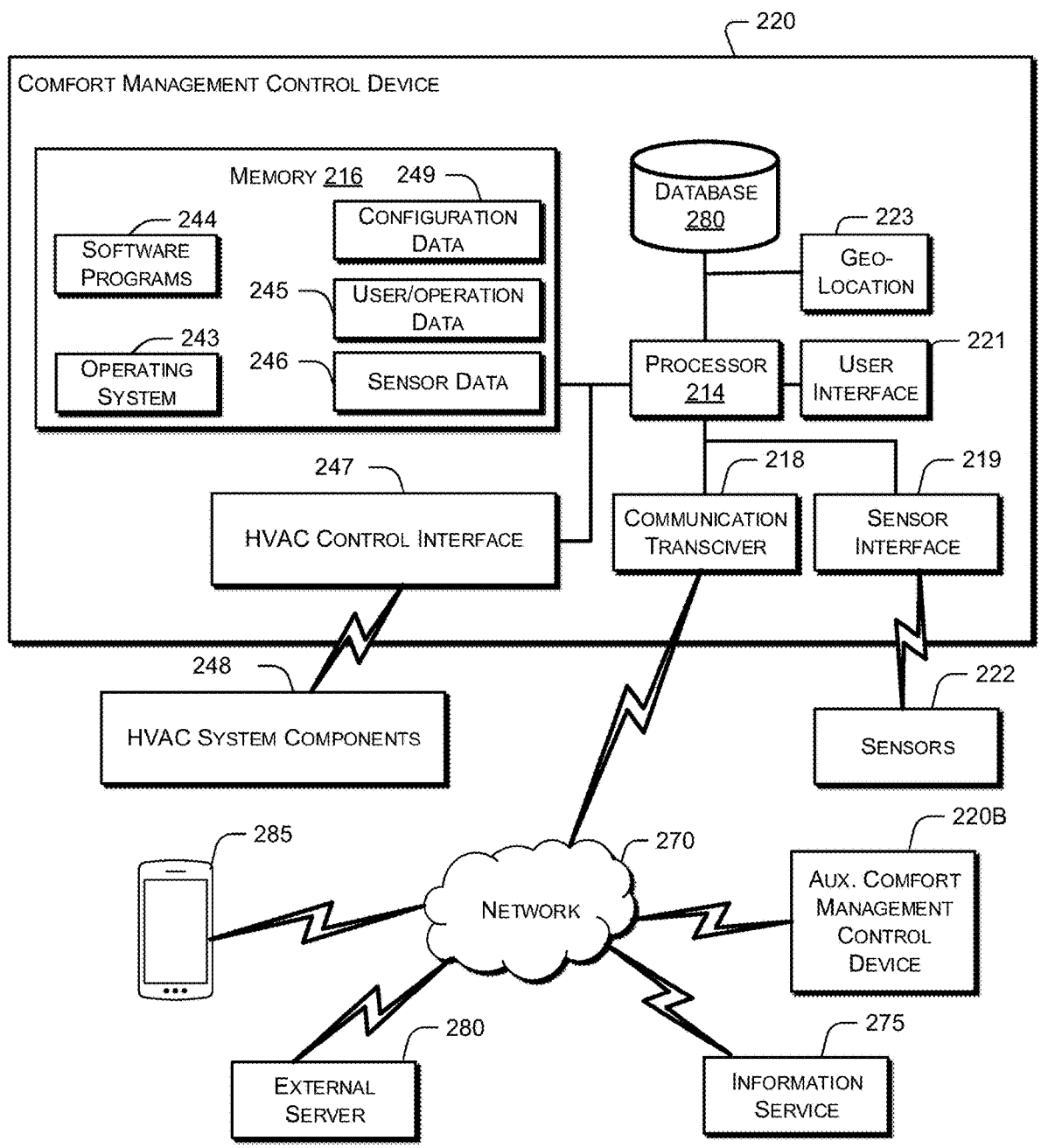
FIG. 2 illustrates a block diagram of a system implementation of the present invention, illustrating the comfort management control device in context with system interfaces.

FIG. 2 illustrates a block diagram of a system implementation of the present invention. Comfort management control device ("CMCD") 220 includes a processor 214 communicatively coupled to a memory 216, an HVAC control interface 247, a communication transceiver 218, a sensor interface 219, a user interface 221, a geolocation device 223, and an optional database 280. Database 280 may be incorporated within memory 216, coupled through a database server internal to CMCD 220, or present within external server 280, and is configured to store any relevant information including configuration data or operational information associated with the CMCD 220. Geolocation device 223 may comprise a GPS unit that furnishes latitude/longitude information for use by the processor in obtaining weather related data associated with the location of the facility 110. Memory 216 is configured to provide volatile memory, nonvolatile memory, or combination of memory types such as RAM, ROM, or FLASH memory, or any other type of storage generally accessible to processor 214. Memory 216 may be utilized to store any desired information, such as software programs 244, an operating system 243, configuration data 249, comfort target data, user data and/or operation data 245, and sensor data 246.

Figure 4:
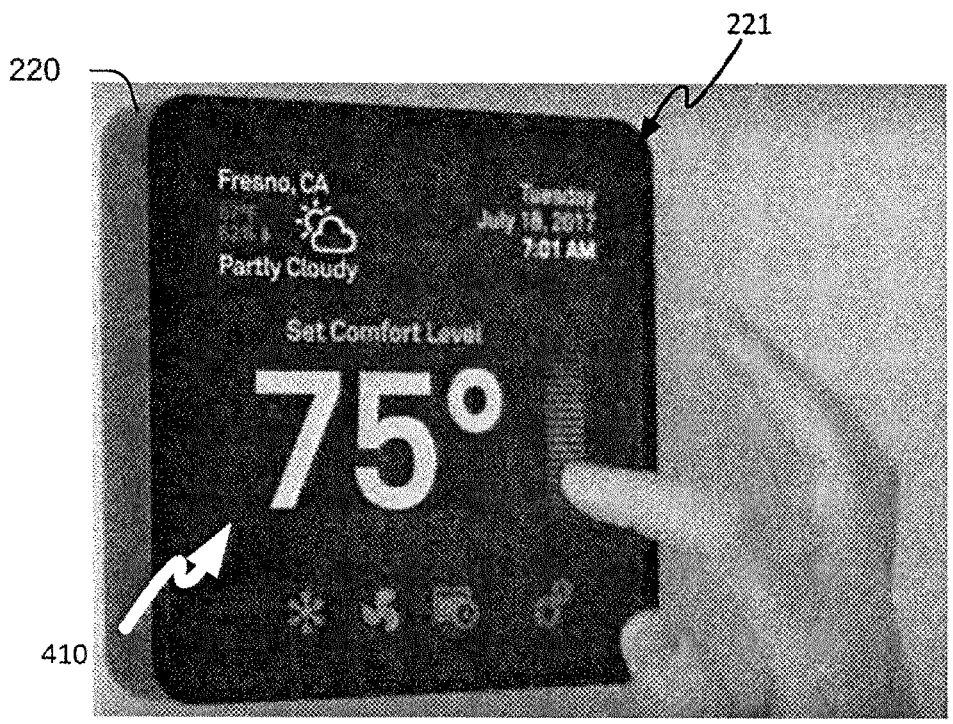
FIG. 4 depicts entry of an initial set point value through a user interface of a comfort management control device of the present invention.
Figure 5:
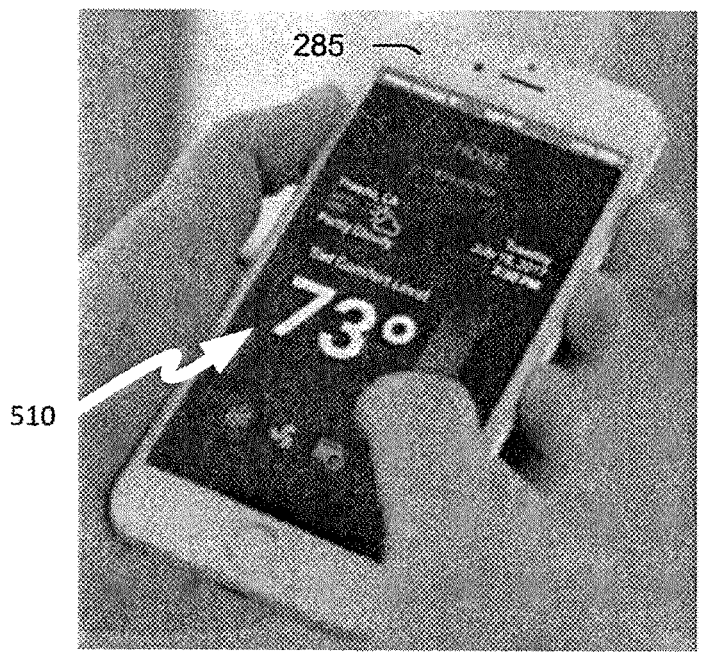
FIG. 5 illustrates setting an initial set point value through a user interface of a mobile device interfaced to the comfort management control device of the present invention.

The HVAC control interface 247 is communicatively coupled to HVAC system components 248, and is configured to provide operational signals to control and operate HVAC system components 248 to maintain a defined treatment region within a comfort zone range. The communication transceiver 218 is communicatively coupled to a network through wired and/or wireless techniques as described above, and provides conductivity to one or more of a mobile device 285, an external server 280, and information service 275, and to an optional auxiliary comfort management control device 220B. CMCD 220B may be configured to interoperate with CMCD 220 in a peer-to-peer communication protocol, or CMCD 220 may act as a master device controlling the second CMCD 220B as a slave device. In such a manner, multiple CMCDs may be utilized to operate disparate HVAC system components in separate defined treatment regions associated with a single facility, or to operate a unitary HVAC system within separate areas of a single facility. In one embodiment, multiple facilities may be maintained through interconnected CMCDs, for instance, when a comfort target moves from one facility to another and it is desired to alter respective comfort zone ranges for the separate facilities. Likewise, a vehicle with an installed CMCD may interoperate with the CMCD installed within a facility to maintain comfort for a person (comfort target) that moves between the vehicle and the facility. The mobile device 285 may be utilized by a person (or comfort target) through an app installed on the mobile device 285 or through a web interface accessed through mobile device 285 to provide inputs or controls to the CMCD 220 (FIG. 5, for example, shows a user changing an initial set point parameter 510 through an app installed in mobile device 285). Such inputs may be in addition to or in lieu of inputs provided through user interface 221. In one embodiment, a user interface 221 may comprise a touch-enabled screen, a microphone, a speaker, and any other necessary components to allow interaction with a user. An exemplary CMCD 220 is shown in FIG. 4, with a user interface 221 implemented as a touch screen, with a user entering an initial set point parameter 410. In various other embodiments, the user interface 221 of CMCD 220 may be configured to display time and date information, along with other information such as operational status of HVAC components and weather forecast information (as shown, for example, on the display illustrated in FIG. 4).

Sensor interface 219 is communicatively coupled to one or more sensors 222. As mentioned previously, such sensors may include such an indoor or exterior temperature sensor; an area occupancy sensor; an infrared temperature measurement sensor; an internal humidity measurement sensor; an external humidity measurement sensor; a barometric pressure sensor; a GPS geolocation sensor; an external wind speed sensor; an external wind direction sensor; a precipitation sensor; an orientation sensor; an electrical current sensor to monitor status of an appliance; and a weather forecast service interface. While weather information may be obtained from information service 275 through network 270, in alternative embodiments a radio receiver may be incorporated within sensor interface 219 to receive and decode radio frequency broadcasts from a server such as the National Weather Service, and act upon emergency alerts that have been broadcast accordingly. Such emergency alerts (such as from NOAA Weather Radio wireless alerts) may be utilized to modify the comfort zone range of a defined treatment region to anticipate the effects from a sudden weather change, and/or create an annunciation notifying occupants of the facility of an impending weather event. The sensor interface 219 may be coupled to sensors 222 through wired connections, wireless connections, or any combination thereof. As stated previously, network 270 may comprise any conventional network including a wireless telephony network, or a conventional Internet connection, and communication transceiver 218 is accordingly configured to interoperate with network 270.

Figure 6:
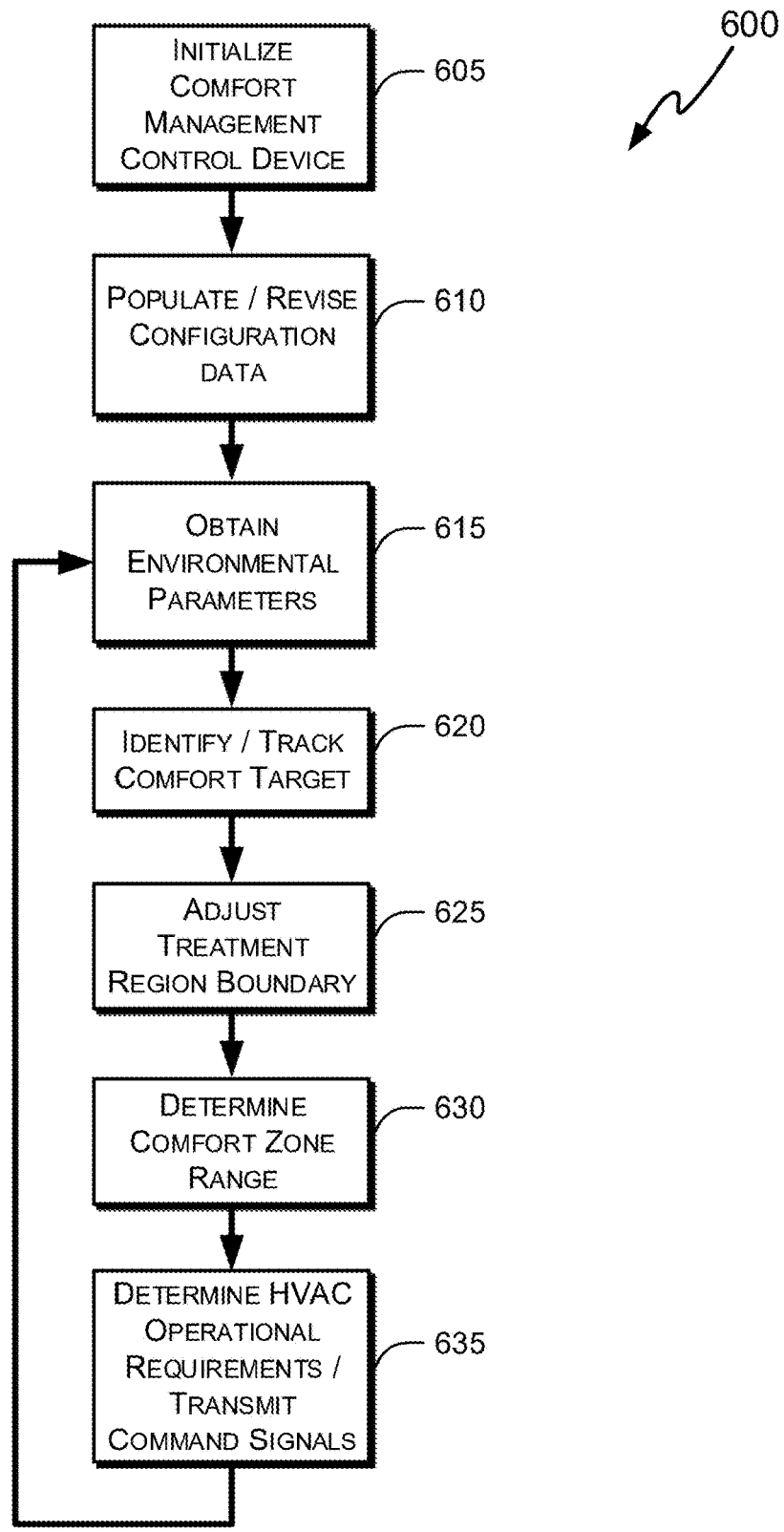
FIG. 6 illustrates one exemplary process of the present invention.

FIG. 6 illustrates one process 600 of the present invention showing initialization and operation of the comfort management control device (CMCD) of the present invention. Operation begins with initialization 605 of the CMCD. Upon initialization and directly thereafter in step 610, process steps are undertaken as shown in more detail in FIG. 7 to accomplish initialization and population/revision of configuration data. In step 705, a facility configuration is entered within the CMCD, by any appropriate method (such as though a user interface of the CMCD, or remotely through a network connection to the CMCD). Entry of facility configuration information may also include, in various embodiments, entry of configuration data through the user interface of the comfort management control device, remote entry of configuration data from a server communicatively coupled to the communication transceiver of the CMCD, relaying configuration data from a second comfort management control device communicatively coupled to the communication transceiver of the CMCD, entering the configuration data though a user interface of a mobile device communicatively coupled to the communication transceiver of the CMCD, and various combinations of the foregoing. Facility configuration information may include, for example, internal volume/floor space information about the facility structure/building or other interior areas or rooms where internal environmental conditions are maintained by the comfort management system; for example, facility configuration information may include a square footage (or other areal/volumetric measurements) of the facility, a location of the facility comprising one of an address or latitude-longitude information of the facility, an altitude of the facility, HVAC equipment types operated at the facility, identification of individually controllable areas within the facility; a desired number of individual defined treatment regions within the facility; an average expected occupancy of the treatment facility; external environmental conditions proximate the facility; insulation configuration of the facility; and room sizes, locations and window configurations within the facility. As mentioned previously, an altitude of the facility may be determined by receiving its location (for instance, through an address entered by a user, or through identification of a nearby location from an IP address associated with the facility, or through geolocation latitude/longitude data obtained from a geolocation circuit included in the CMCD), and then the location is utilized to look up a corresponding altitude from an external data source (through the network interface, for example). Alternatively, altitude of the facility may be directly obtained from a GPS circuit or an altimeter included in the CMCD.

Figure 7:
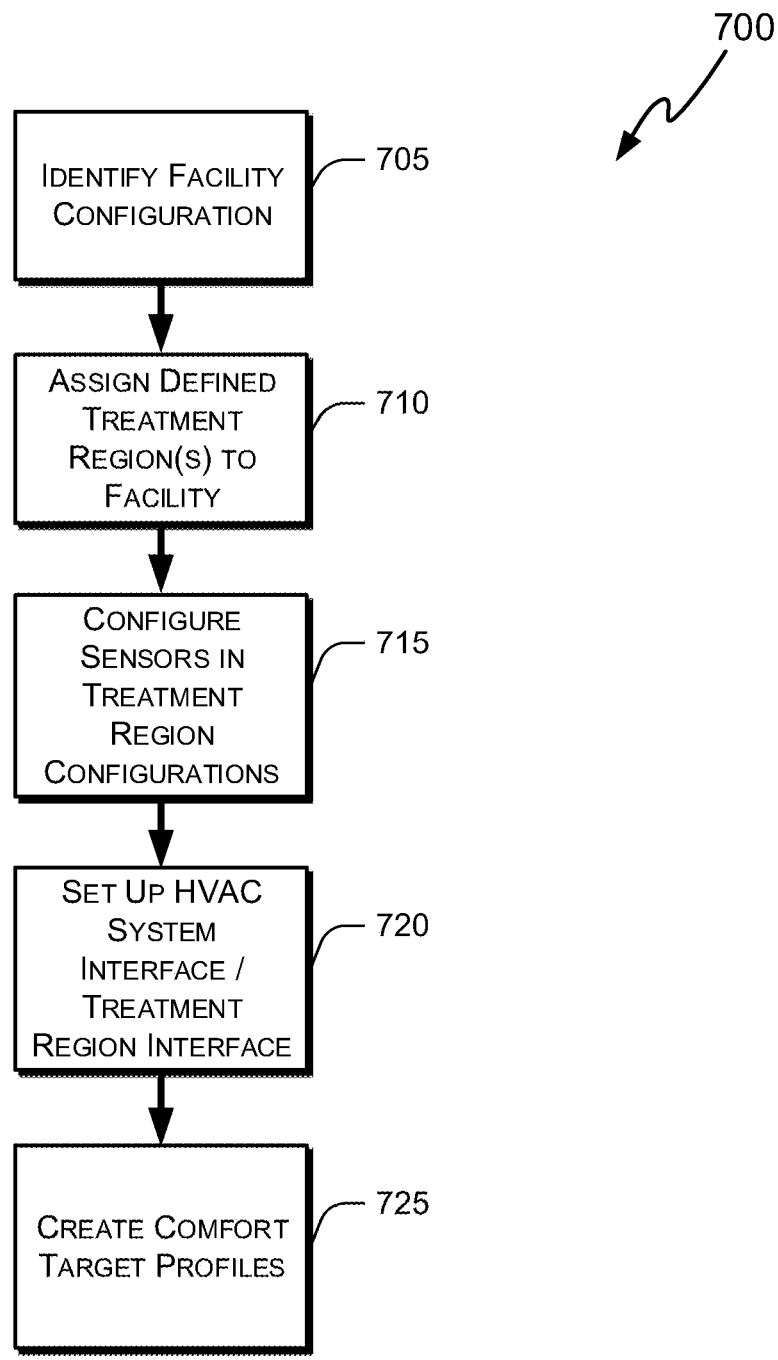
FIG. 7. provides a detailed process listing of elements of the process flow diagram of FIG. 6.

The process of FIG. 7 continues with assignment 710 of one or more default defined treatment regions to the facility as configured in step 705. The default defined treatment regions may in one embodiment represent a volume that includes all habitable internal spaces of the facility. Alternatively a default defined treatment region may in one embodiment represent a partial volume of the internal volume of the facility, representing a subset of habitable areas of the facility. A plurality of defined treatment regions may also be defined and respectively assigned to specified portions of the described facility, as mentioned above in regards to FIGS. 1, 1A and 1B at reference numerals 117A, 177B, 177C. A plurality of defined treatment regions provides additional refinement or granularity in controlling environments in disparate sections of a facility, so that the entire facility may not have to be maintained within a single comfort zone range. Thus, for example, comfort levels of rooms that are unoccupied for extended periods of time may be allowed to fall outside of a comfort zone range that would be tracked within a defined treatment region, resulting in energy savings and decreased HVAC system wear. While default defined treatment regions are assigned in step 710, as mentioned previously the one or more defined treatment regions of the present invention may be dynamically redefined (as shown, for example, in regards to FIG. 1B and accompanying text), as occupancy, use, and environmental conditions appurtenant to the facility vary over time.

Steps in initializing the comfort management control device continues with FIG. 7 step 715, where the sensor interface regarding sensors in each respective defined treatment regions is configured. As mentioned previously, the sensor interface of the present invention may be configured to obtain environmental information of any desired type from any provided sensors, including, for instance, a temperature sensor, an area occupancy sensor, an infrared temperature sensor, an internal humidity measurement sensor, an external humidity measurement sensor, a barometric pressure sensor, a GPS geolocation sensor; an internal temperature sensor, an external temperature sensor, an external wind speed sensor, an external wind direction sensor, a precipitation sensor, and a weather forecast service interface. The temperature sensor may comprise any type of temperature sensing device, including, but not limited to, a thermistor, a thermocouple, a semiconductor, an infrared sensor or any other type of temperature sensor. The area occupancy sensor may comprise any type of sensor detecting occupation of building area by a person or pet, including, but not limited to, an ultrasonic sensor, passive infrared sensor, a reflected RF sensor, a capacitive sensor, or any other type of occupancy sensor. By way of example using the illustration of FIG. 1A, sensor 222A may be assigned to defined treatment region 177A, sensors 222E and 222B may be assigned to default defined treatment region 177B, and sensors 222D and 222E may be assigned to default treatment region 177C.

Initializing the comfort management control device continues with FIG. 7 step 720, where HVAC system interfaces and treatment region interfaces are established. For example, if any dampers are configured to operate in ducts located in a defined treatment region, interfaces to those dampers (whether by a wired connection or through a wireless RF protocol) is set up to allow control of the dampers within the applicable defined treatment region. Further, interfaces to controls of other HVAC system components is also established, allowing the CMCD to operate the HVAC to maintain the environment within the relevant defined treatment area within a comfort zone range. The HVAC control interface, for example, controls fans and heating and cooling equipment to maintain an environment within the defined treatment region within the identified comfort zone range. Maintaining the comfort zone range in this manner may cause the HVAC control interface to operate the HVAC system components for longer or shorter durations than they would operate when controlling to a comfort level corresponding to a comfort target's initial set point parameter.

In FIG. 7, 725, comfort target profiles are created. As mentioned previously, comfort targets can comprise one or more of a person, a group of people, a pet, an environmentally-sensitive article, or any item for which an environmental comfort zone is to be maintained within the facility. Each type of comfort target may have unique desires and attributes that define comfort within the defined comfort region. For example, each person within the aforementioned group of people may have unique preferred temperature ranges, some of which may overlap. As such, comfort target profiles are created 725 which provide information that one or more comfort target records, each comfort target record including one or more of a comfort target unique ID and one or more of an initial set point parameter associated with the comfort target unique ID; a comfort target type; a preferred occupancy area of the facility; a default occupancy schedule; and priority information regarding resolution of comfort zone range conflicts. Optionally, each comfort target record may further respectively include biometric information such as age, height, gender, likely room of domicile (bedroom), and likely work room (e.g. office); such parameters may assist the CMCD with determining the identify of an occupant being tracked by the sensors of the present invention, and may also assist with population of default values such as the initial set point parameter. Further, identifying information of a mobile device used by a tracking target (such as a mobile phone number or IMEI of such mobile device) may be entered into the comfort target record so that communications with the comfort target's mobile device may provide tracking information or prediction information to allow dynamic adjustment of the defined treatment region (for instance if the comfort target is arriving at the facility and is preparing for ingress) or to allow dynamic adjustment of the comfort zone range (for instance, the comfort target utilizes software on the comfort target's mobile device to send information to the CMCD to adjust a HVAC operational mode, a comfort level or an initial comfort parameter).

Returning to FIG. 6, after population and/or revision of configuration data 610, environmental parameters are obtained 615. Environmental parameters are utilized by embodiments of the present invention, in addition to other information, to compute a comfort zone range for a comfort target. Environmental parameters are obtained by the CMCD through the sensor interface (and/or from information service 275 though network 270), and may include parameters such as an outdoor temperature, an indoor relative humidity reading, an outdoor relative humidity reading, and an elevation of the defined treatment region, an atmospheric pressure, a wind direction, a wind speed, an expected solar irradiation load, an expected human occupant load, an expected equipment and lighting load, and the like. The parameters may be measured by a periodic polling of inputs to the sensor interface, and may comprise digital or analog inputs as desired for implementation in the CMCD; in an alternate embodiment, sample and hold circuitry maintains a continual input of a sensor input values to the sensor interface, and alternatively, or in addition, a change in a sensor value may trigger an interrupt service routine in the CMCD processor to act upon the change in the sensor parameter. In any event, environmental parameters may be obtained from the sensor interface and/or communication transceiver 218 and stored in the CMCD memory in any desired manner, for further processing by the CMCD processor.

Among the environmental parameters monitored by the CMCD, occupancy sensor data (in addition to other data such as location data of a mobile device associated with a comfort target) is used to determine what part, if any, of a facility is being occupied by a comfort target. If portions of the facility are occupied by persons that cannot be correlated to one or more comfort targets profiles stored in the CMCD in step 725, a default comfort target may be used. On the other hand, if only one comfort target profile is stored, that profile is used until the system is further reconfigured with additional comfort target profiles. In any event, based on characteristics of multiple occupants, the CMCD devices utilize a tracking profile assigning a most likely comfort target profile to occupants of the facility. As such occupants move room to room, sensors in the rooms detect such motion and track the occupants (and most likely comfort target profiles) accordingly. This tracking, in turn is used for input to adjust the defined treatment region boundaries as provided in step 625.

As discussed in regards to FIGS. 1A and 1B, defined treatment regions may be a single region for a facility, or may be adjusted dynamically based on, for instance, occupancy of all or part of the facility. For a single comfort target in an uncomplicated facility, one defined treatment region may be all that is assigned during system configuration; on the other hand, as described above, multiple defined treatment regions may be assigned to areas or regions of a facility to coordinate, for example, separate HVAC system components servicing such areas or regions. The treatment region boundaries may vary based on occupancy by a comfort target or person occupying the facility, and when the facility is completely unoccupied, may assume a default unoccupied state to maintain environmental conditions at levels commensurate with reduced energy expenditure. Also as mentioned previously system components such as dampers may be actuated through the HVAC interface to maintain conditions within defined treatment areas within a comfort zone range, but allow areas of a facility not within a defined treatment region to assume an environmental state commensurate with reduced energy expenditure compared to an area inside of a defined treatment region (or otherwise in an occupied state).

Embodiments also provide for determination of a comfort zone range 630. In one embodiment, determination of the comfort zone range is based on location information regarding the facility (to derive, for example, altitude information and environmental parameters and weather patterns proximate the facility) and the differential between the indoor and outdoor environmental conditions. The CMCD may determine the comfort zone range, by, for example, performing a psychrometric analysis the of the indoor and outdoor environmental conditions based on the location information in further view of the initial set point parameter specified by the comfort target; more particularly, determination of the comfort zone range uses values obtained from a difference between indoor and outdoor relative humidity, a difference between indoor temperature and outdoor temperature, an initial set point parameter, and an elevation of the defined treatment region.

The comfort zone range determination may also be made in regards to calculation of a range of values using the indoor and outdoor environmental parameters, and may further include calculating indoor and outdoor enthalpy. The comfort zone range is used to control HVAC equipment through the HVAC control interface to maintain a desired comfort level in a space of the facility (more particularly, within a defined treatment region). The comfort zone range may be defined between a predetermined range with the predetermined range being based on the indoor and outdoor conditions, and a predetermined default value for the comfort zone range may be initially specified during initialization and population 605, 610 of configuration data. The comfort zone range may be reset to a the predetermined range (such as the default range) and may fluctuate based on the indoor and outdoor conditions obtained from the environmental parameters. In one embodiment, determining a comfort zone range related to the defined treatment region may further comprise identifying a change in one or more environmental loading factors (such as occupancy, operation of appliances, solar irradiation received by the facility, weather patterns, and the like) and adjusting operation of the HVAC interface to compensate for the change in the one or more environmental loading factors. The sensor interface of the present invention, along with monitoring of environmental conditions allows for inclusion of changes in various environmental factors to be considered in determining comfort zone ranges. By way of a simple example, if more or fewer people enter a treated facility, or if appliances such as dishwashers, ovens, or showers are operated within the facility, environmental loading conditions may be altered requiring compensational operation of HVAC equipment. HVAC system components are operated through command signals transmitted 635 through the HVAC control interface (discussed further in regards to FIG. 2.

The CMCDs HVAC control interface controls fans and heating and cooling equipment of the HVAC components to maintain an environment of the defined treatment region within the comfort zone range. Maintaining the environment of the defined treatment region in this manner may cause the HVAC components controlling the environment in the defined treatment region to operate for longer or shorter durations than they would operate when controlling to an initial set point parameter only. Because the comfort zone range is dynamically adjusted in relation to comfort target occupancy and indoor and outdoor conditions, better comfort control can be achieved while optimizing energy expenditure that is required to maintain comfort for facility occupants. In one illustrative embodiment of the present invention, using the comfort zone range implemented in the CMCD in the summer time will lead to the CMCD turning off the AC system at a 2-3° F. higher point than a comfort target's initial set point, and will lead to a savings of approximately 10-15% on energy consumption. Further, if a humidifier is included in the among the HVAC system components, the comfort zone range may be modified to provide superior comfort in colder, dryer winter months, allowing the comfort target to feel more comfortable and warmer than it actually is with optimal energy expenditure.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

Various operations or functions are described herein, which may be implemented or defined as software code or instructions. Such content may be directly executable ("object" or "executable" form), source code, bytecode (e.g. from "Java" source) or difference code ("delta" or "patch" code). Software implementations of the embodiments described herein may be provided via an article of manufacture with the code or instructions stored thereon, or via a method of operating a user interface to send data via the communication interface. A machine or computer-readable storage medium may cause a machine to perform the functions or operations described, and includes any mechanism that stores information in a form accessible by a machine (e.g., computing device, electronic system, and the like), such as recordable/non-recordable medium (e.g., read only memory (ROM), random access memory (RAM), magnetic disk storage medium, optical storage medium, flash memory devices, and the like). A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present invention also relates to a system for performing the operations herein. This system may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of medium suitable for storing electronic instructions, each coupled to a computer system bus.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be interpreted as open ended, such that an item or items following any one of these words is not meant to be an exhaustive listing of the item or items, or meant to be limited to only the listed item or items. And the singular forms "a," "an," and "the" are intended to include plural references, unless the context clearly dictates otherwise.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A comfort management system comprising a comfort management control device, the comfort management control device comprising:
   a processor communicatively coupled to:
      a user interface comprising a display and tactile interface; and
      a memory device configured to store:
         code executable by the microprocessor; and
         configuration data regarding management of a plurality of defined treatment regions;
   an interface to a plurality of sensors each configured to receive a plurality of environmental parameters regarding each of the plurality of defined treatment regions;
   wherein the plurality of environmental parameters comprise an indoor temperature, an outdoor temperature, an indoor relative humidity reading, an outdoor relative humidity reading, and an elevation of the each defined treatment region;
   a communication transceiver for communication with a network;
   an HVAC control interface configured to receive commands from the processor to operate one or more HVAC components;

wherein:
the executable code comprises instructions that when executed by the processor performs, for each of the plurality of defined treatment regions:
receiving an initial set point parameter associated with a plurality of comfort targets, each in a respective one of the plurality of defined treatment regions;
dynamically determining a comfort zone range related to the each defined treatment region based upon the initial set point parameter and the plurality of environmental parameters, wherein dynamically determining the comfort zone range related to the each defined treatment region further comprises analyzing:
a difference between indoor and outdoor relative humidity;
a difference between indoor temperature and outdoor temperature;
the initial set point parameter; and
an elevation of the each defined treatment region;
wherein, for a given initial set point parameter and a given elevation, the dynamically determined comfort zone range changes as a function of at least one of the difference between indoor and outdoor relative humidity and the difference between indoor temperature and outdoor temperature; and
operating the HVAC control interface to condition an environment within the each defined treatment region to maintain the environment within the dynamically determined comfort zone range.

2. The system of claim 1, wherein each said initial set point parameter comprises one or more of:
a preferred indoor temperature;
a preferred indoor relative humidity level;
a default preferred indoor temperature;
a minimum desired indoor temperature; and
a maximum desired indoor temperature.

3. The system of claim 1, wherein each of the plurality of comfort targets comprises one or more of:
a person;
a group of people;
a pet; and
an environmentally-sensitive article.

4. The system of claim 1, wherein the interface to one or more sensors accepts environmental parameters from one or more of:
an area occupancy sensor;
an infrared temperature measurement sensor;
an internal humidity measurement sensor;
an external humidity measurement sensor;
a barometric pressure sensor;
a GPS geolocation sensor;
an internal temperature sensor;
an external temperature sensor;
an external wind speed sensor; and
a weather forecast service.

5. The system of claim 1, wherein the interface to an environmental monitoring sensor further comprises an interface to an external server.

6. The system of claim 1, wherein the HVAC control interface is configured to operate one or more of a heat pump; a forced air heat system; a radiant heating system; a geothermal heating system; a geothermal cooling system; a solar heating system; an evaporative cooler; a damper; a ventilation system; and a humidity control system.

7. The system of claim 1, wherein:
the system comprises at least one damper operating a duct located proximate to the defined treatment region; and
wherein the system is further configured to operate the damper based on occupancy by a member of the comfort target of a portion of the defined treatment region proximate the damper.

8. The system of claim 1, wherein the system comprises at least one damper, and wherein the system is further configured to operate the damper based on a predicted occupancy by a member of the comfort target of a portion of the treatment region proximate the damper.

9. The system of claim 1, further comprising:
entering configuration data into the memory of the comfort management control device, wherein entry of configuration data into the comfort management control device comprises one of:
entry of the configuration data through the user interface of the comfort management control device;
remote entry of the configuration data from a server communicatively coupled to the communication transceiver;
relaying configuration data from a second comfort management control device communicatively coupled to the communication transceiver;
entering the configuration data though a user interface of a mobile device communicatively coupled to the communication transceiver; and
combinations thereof.

10. The system of claim 9, wherein the configuration data comprises:
facility information regarding a facility that includes the defined treatment region, the facility information including one or more of:
a square footage of the facility;
a location of the facility comprising one of an address or latitude-longitude information;
HVAC equipment types operated at the facility;
identification of individually controllable areas within the facility;
a desired number of individual defined treatment regions within the facility;
an average expected occupancy of the treatment facility;
external environmental conditions proximate the facility; and
comfort target information comprising one or more comfort target records, each comfort target record including a comfort target unique ID and one or more of:
an initial set point parameter associated with the comfort target unique ID;
a comfort target type;
a preferred occupancy area of the facility;
a default occupancy schedule; and
priority information regarding resolution of comfort zone range conflicts.

11. The system of claim 9, wherein retrieving an initial set point parameter associated with a comfort target and the defined treatment region further comprises retrieving the initial set point parameter from the configuration data entered into the memory device.

12. The system of claim 1, further configured to monitor the defined treatment region and adjust one or more defined boundaries of the defined treatment region based on monitoring at least one of the comfort target and a sensor input obtained from the environmental monitoring sensor.

13. The system of claim 12, wherein monitoring the defined treatment region further comprises:
   predicting a change in the composition of the comfort target;
   computing an occupancy interval affected by the change in the comfort target;
   computing a desired comfort range for the occupancy interval; and
   operating the HVAC interface to bring the environment of the defined treatment region to within the desired comfort range for the computed occupancy interval.

14. The system of claim 13, further comprising predicting when a member of the comfort target is predicted to arrive at a location within an area proximate to the defined treatment region.

15. The system of claim 13, wherein:
   the comfort target comprises a plurality of persons respectively associated with a plurality of respective initial set point parameters; and
   wherein determining a comfort zone range further comprises computing a composite comfort level based on the plurality initial set point parameters.

16. The system of claim 13, wherein
   the comfort target comprises a plurality of persons respectively associated with a plurality of respective initial set point parameters; and
   wherein determining a comfort zone range further comprises computing a consensus comfort range when members of the comfort target are collocated within an internal area of the defined treatment region.

17. The system of claim 13, wherein determining a comfort zone range related to the defined treatment region further comprises:
   identifying a change in one or more environmental loading factors; and
   adjusting operation of the HVAC interface to compensate for the change in the one or more environmental loading factors.

18. The system of claim 17, wherein a change in the environmental loading factors includes at least one of:
   a change in the number of members of the comfort target;
   a weather forecast obtained through the communications transceiver;
   a change in an operational status of an appliance located within the defined treatment region;
   a change in operational status of bathing facilities located within the defined treatment region;
   a detected egress by a member of the comfort target;
   a detected ingress by a member of the comfort target;
   a predicted ingress or egress by a member of the comfort target;
   a change in wind patterns proximate to the defined treatment region;
   detection, through the one or more sensors, of a precipitation event exterior to and proximate to the defined treatment region; and
   a change in the operational status of landscape watering systems proximate to the defined treatment region.

19. The system of claim 18, further comprising:
   predicting ingress or egress by a member of the comfort target by receiving, through the communications interface, a communication from a mobile device associated with a member of the comfort target; and
   wherein the communication comprises one or more of:
      a reported location of a mobile device;
      a calculated direction of movement of the mobile device;
      an estimated time of arrival reported by an app being executed by the mobile device;
      an estimated time of departure based on historical data associated with movement of the mobile device; and
      an estimated time of departure based upon a scheduled event associated with the member of the comfort target.

20. The system of claim 1, further comprising adjusting the defined treatment region by predicting when the comfort target is to be within the defined treatment region, and operating HVAC to bring the defined treatment region to within a computed comfort level for the predicted occupancy state of the defined treatment region by the comfort target.

21. The system of claim 1 further comprising monitoring a behavior of a member of the comfort target to detect a perceived level of comfort, and adjusting the comfort zone range based on the detection.

22. The system of claim 21, wherein detecting a perceived level of comfort includes one or more of:
   detecting a movement pattern of the member of the comfort region;
   detecting a change in body temperature of the member of the comfort region; and
   monitoring changes to an initial set point parameter entered by the member of the comfort target.

23. The system of claim 21, wherein detecting a perceived level of comfort includes one or more of:
   accumulating historical data regarding use of the treatment region by the member of the comfort target; and
   identifying a variable comfort zone range based on the historical data.

24. The system of claim 1, further comprising a plurality of communicatively coupled comfort management control devices located within the defined treatment region, wherein the plurality of communicatively coupled comfort management control devices comprise respectively connected HVAC control interfaces to maintain an environmental condition of the defined treatment region within the comfort zone range.

25. The system of claim 24, wherein:
   the plurality of communicatively coupled comfort management control devices are connected in a master/slave protocol, wherein a first of the plurality of the comfort management control devices is designated as a master control device and the remainder of the plurality designated as slave control devices; and
   the master control device provides one of data or instructions to the slave control devices to maintain the environmental condition of the defined treatment region within the comfort zone range.

26. The system of claim 1, wherein the user interface further comprises a networked input for receiving commands from one of a mobile device communicatively coupled to the comfort management control device through the communication transceiver.

27. The system of claim 26, wherein the mobile device is further configured to execute an application that communicatively provides data to the comfort management control device and receives information from the comfort management control device.

28. The system of claim 1, wherein the communication transceiver provides one or more of a wireless or wired connectivity from the comfort management control device to a network.

29. The system of claim 1, wherein the communication transceiver is configured to operate with a wireless protocol comprising one or more of:
- an ISO 14443 protocol;
- an ISO 18000-6 protocol;
- a Bluetooth protocol;
- a Zigbee protocol;
- a Wibree protocol;
- a WiFi protocol,
- an IEEE 802.15 protocol;
- an IEEE 802.11 protocol;
- an IEEE 802.16 protocol;
- an ultra-wideband (UWB) protocol;
- a cellular telephony protocol; and
- and combinations thereof.

30. The system of claim 1, wherein the dynamically determined comfort zone range also changes as a function of the difference between indoor and outdoor temperature and indoor and outdoor relative humidity.

* * * * *

UNITED STATES PATENT AND TRADEMARK OFFICE
CERTIFICATE OF CORRECTION

| | |
|---|---|
| PATENT NO. | : 11,009,248 B2 |
| APPLICATION NO. | : 15/949988 |
| DATED | : May 18, 2021 |
| INVENTOR(S) | : Mohamed Farouk Salem et al. |

It is certified that error appears in the above-identified patent and that said Letters Patent is hereby corrected as shown below:

On the Title Page

Left Column, item (73):
Please change the Assignee from "Air2O Inc." to --Innovative Climatic Technologies Corporation--

Signed and Sealed this
Thirteenth Day of February, 2024

*Katherine Kelly Vidal*

Katherine Kelly Vidal
*Director of the United States Patent and Trademark Office*